United States Patent
Shoa (10) Patent No.: US 10,706,175 B2
(45) Date of Patent: Jul. 7, 2020

(54) METHOD AND APPARATUS FOR HIDING PRIVATE BROWSING DATA

(71) Applicant: Nirvon Shoa, Port Moody (CA)

(72) Inventor: Nirvon Shoa, Port Moody (CA)

( * ) Notice: Subject to any disclaimer, the term of this patent is extended or adjusted under 35 U.S.C. 154(b) by 163 days.

(21) Appl. No.: 15/616,933

(22) Filed: Jun. 8, 2017

(65) Prior Publication Data

US 2017/0357827 A1    Dec. 14, 2017

Related U.S. Application Data

(60) Provisional application No. 62/348,146, filed on Jun. 10, 2016.

(51) Int. Cl.
| | |
|---|---|
| *G06F 21/62* | (2013.01) |
| *H04L 29/06* | (2006.01) |
| *G06F 16/951* | (2019.01) |
| *G06F 16/957* | (2019.01) |

(52) U.S. Cl.
CPC ........ *G06F 21/6263* (2013.01); *G06F 16/951* (2019.01); *G06F 16/957* (2019.01); *H04L 63/0428* (2013.01); *H04L 63/08* (2013.01)

(58) Field of Classification Search
None
See application file for complete search history.

(56) References Cited

U.S. PATENT DOCUMENTS

| | | | | |
|---|---|---|---|---|
| 8,316,460 | B1* | 11/2012 | Wang | H04L 63/0428 713/165 |
| 10,216,852 | B1* | 2/2019 | Gupta | G06F 16/9537 |
| 2012/0036556 | A1* | 2/2012 | LeBeau | G06F 3/048 726/3 |
| 2012/0198524 | A1* | 8/2012 | Celebisoy | G06F 21/6263 726/5 |
| 2012/0240237 | A1* | 9/2012 | Kanevsky | G06F 16/957 726/26 |
| 2012/0284297 | A1* | 11/2012 | Aguera-Arcas | G06F 3/03547 707/769 |
| 2015/0332065 | A1 | 11/2015 | Li et al. | |
| 2016/0154771 | A1* | 6/2016 | Tang | G06F 3/0481 715/234 |

OTHER PUBLICATIONS

Crowbar Solutions, Frost Browser, http://www.crowbarsolutions.com/projects/frost-browser-for-android/, 2011.
Microsoft, In Private Browsing, https://www.microsoft.com/nz/ie9/features/inprivatebrowsing.aspx, 2010.
Crowbar Solutions, Frost Browser Release Notes, http://www.crowbarsolutions.com/frost-browser-release-notes/, 2011-2017.

* cited by examiner

*Primary Examiner* — Kaveh Abrishamkar (57) ABSTRACT

A browsing session integrated with a hidden credential authentication system and with a privacy level mode property is created or resumed. Private browsing data is encrypted and hidden and can be accessed by inputting correct credentials. If credentials inputted into the hidden credential authentication system match credentials stored on a storage medium, access is granted to one or more types of private browsing data.

22 Claims, 6 Drawing Sheets

METHOD AND APPARATUS FOR HIDING PRIVATE BROWSING DATA

CROSS REFERENCE TO RELATED APPLICATIONS

This application claims the benefit of U.S. Provisional Application No. 62/348,146, titled "Method and Apparatus for Hiding Private Browsing Data," and filed on Jun. 10, 2016.

BACKGROUND

The present invention relates to the field of internet browsing technology, and more particularly to hiding private browsing data.

A common solution to protecting the confidentiality of a user's browsing session is activating a browsing mode in which no data regarding a user's browsing session is stored in a storage medium. Another common solution is activating a browsing mode in which access to private browsing data can be gained by inputting correct credentials into a non-hidden credential authentication system. A setback in the first solution is that the user lacks the freedom of storing browsing data. A setback in the second solution is that the existence of private browsing data is revealed when the existence of the non-hidden credential authentication system is revealed.

BRIEF SUMMARY OF THE INVENTION

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

The present disclosure provides a non-transitory computer-readable medium, a computer implemented method, and a web browsing apparatus, for protecting and hiding the existence of private browsing data. It comprises of a web browser that integrates a hidden credential authentication system into one or more browsing modes. A non-limiting example of a browsing mode is traceless browsing. Access to the private browsing data is unlocked upon a condition in which correct credentials are inputted into the hidden credential authentication system. These and other features of the invention will be more readily understood upon consideration of the attached drawings and of the following detailed description of those drawings and the presently-preferred and other embodiments of the invention.

DETAILED DESCRIPTION OF THE INVENTION

Throughout the description and claims or inventive concepts of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Figure 1:
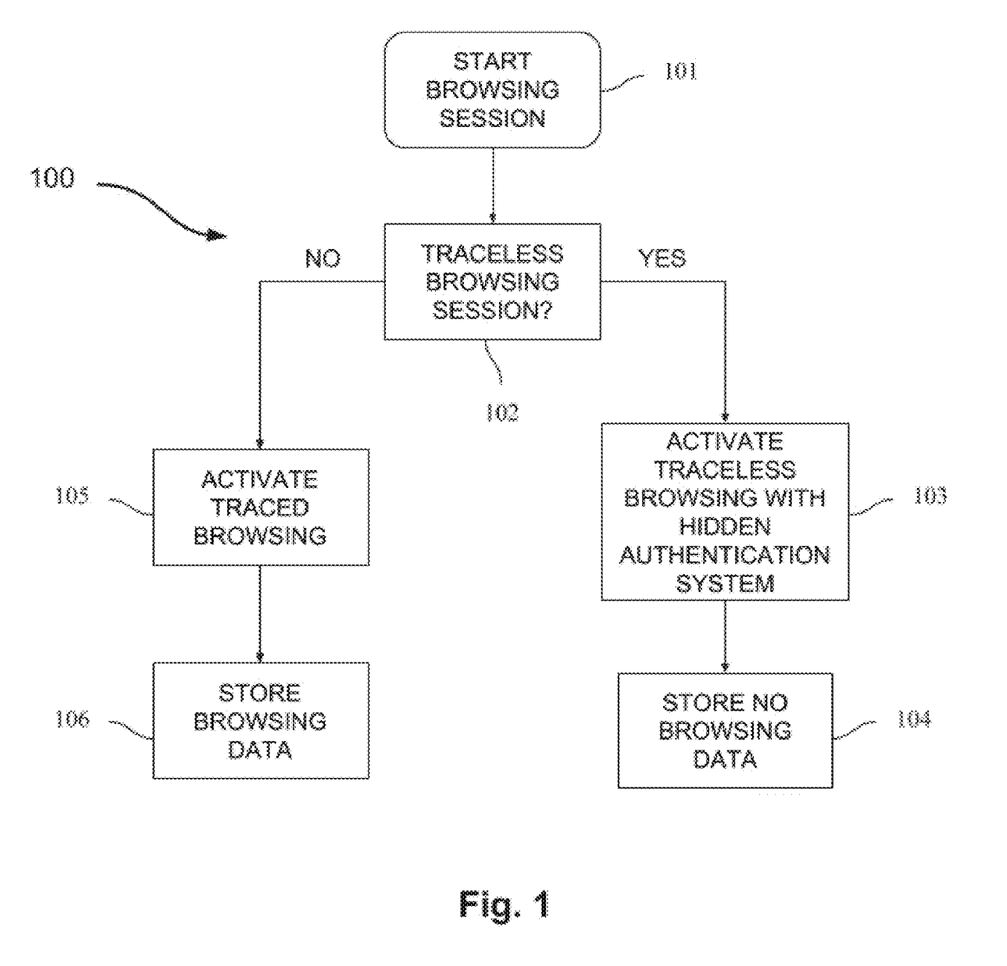
FIG. 1 is a flow diagram that illustrates a method of configuring a browser's privacy mode in accordance with one or more embodiments of the present disclosure.
Figure 2:
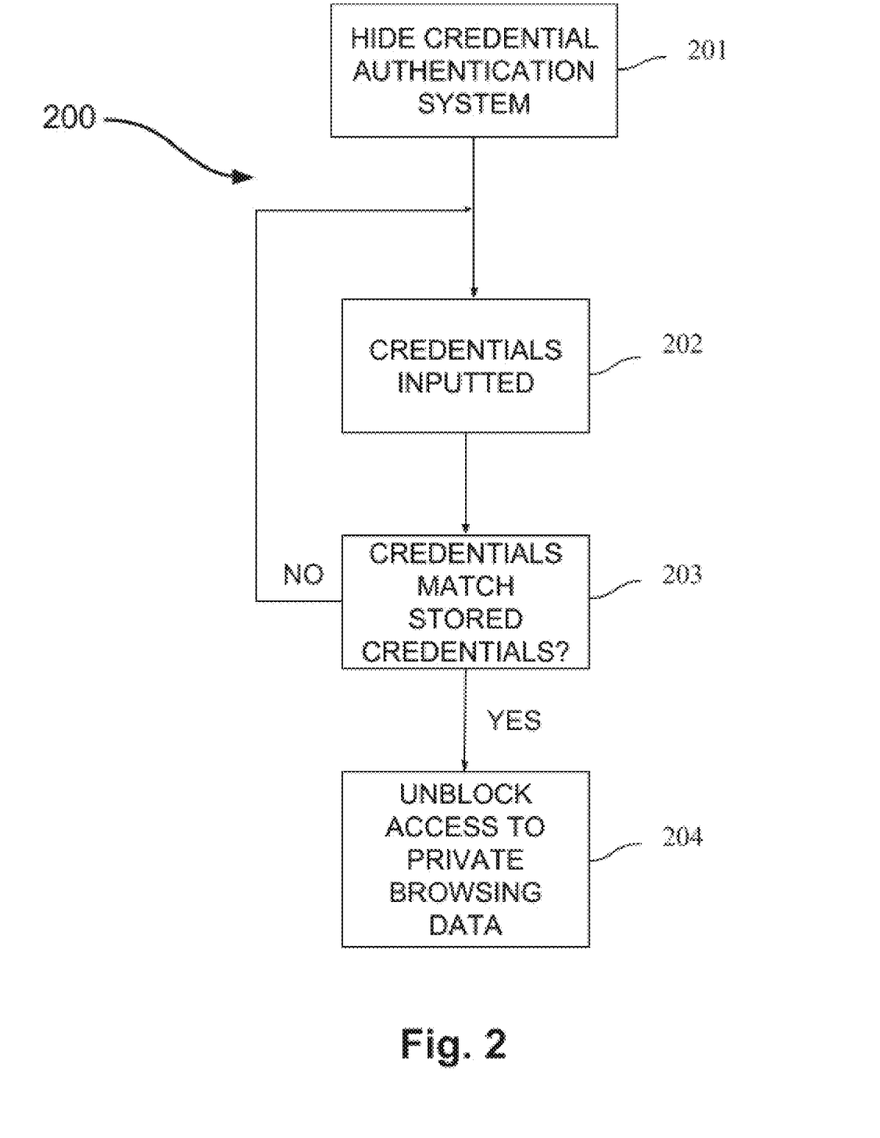
FIG. 2 is a flow diagram that illustrates a method of hiding a credential authentication system in accordance with one or more embodiments of the present disclosure.
Figure 3:
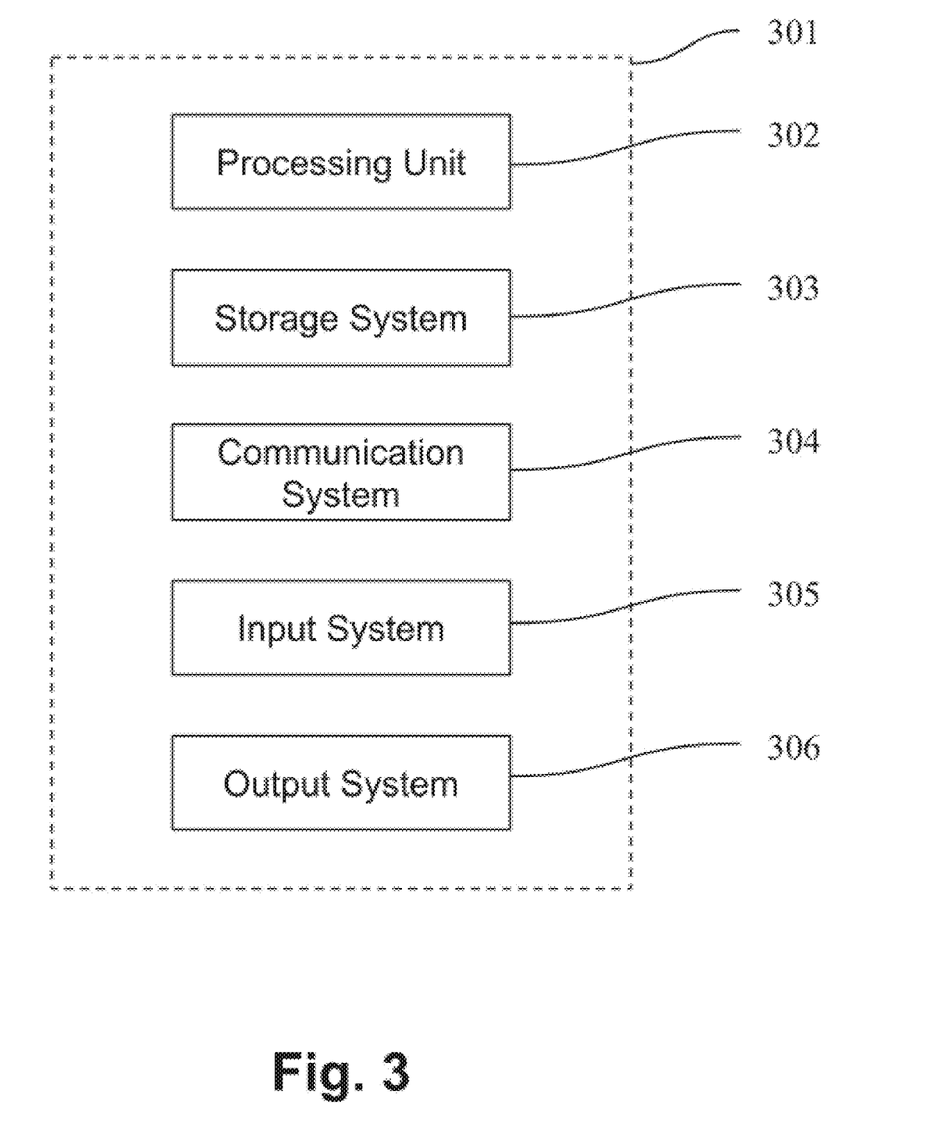
FIG. 3 is a block diagram of a computing system in accordance with one or more embodiments of the present disclosure.
Figure 4:
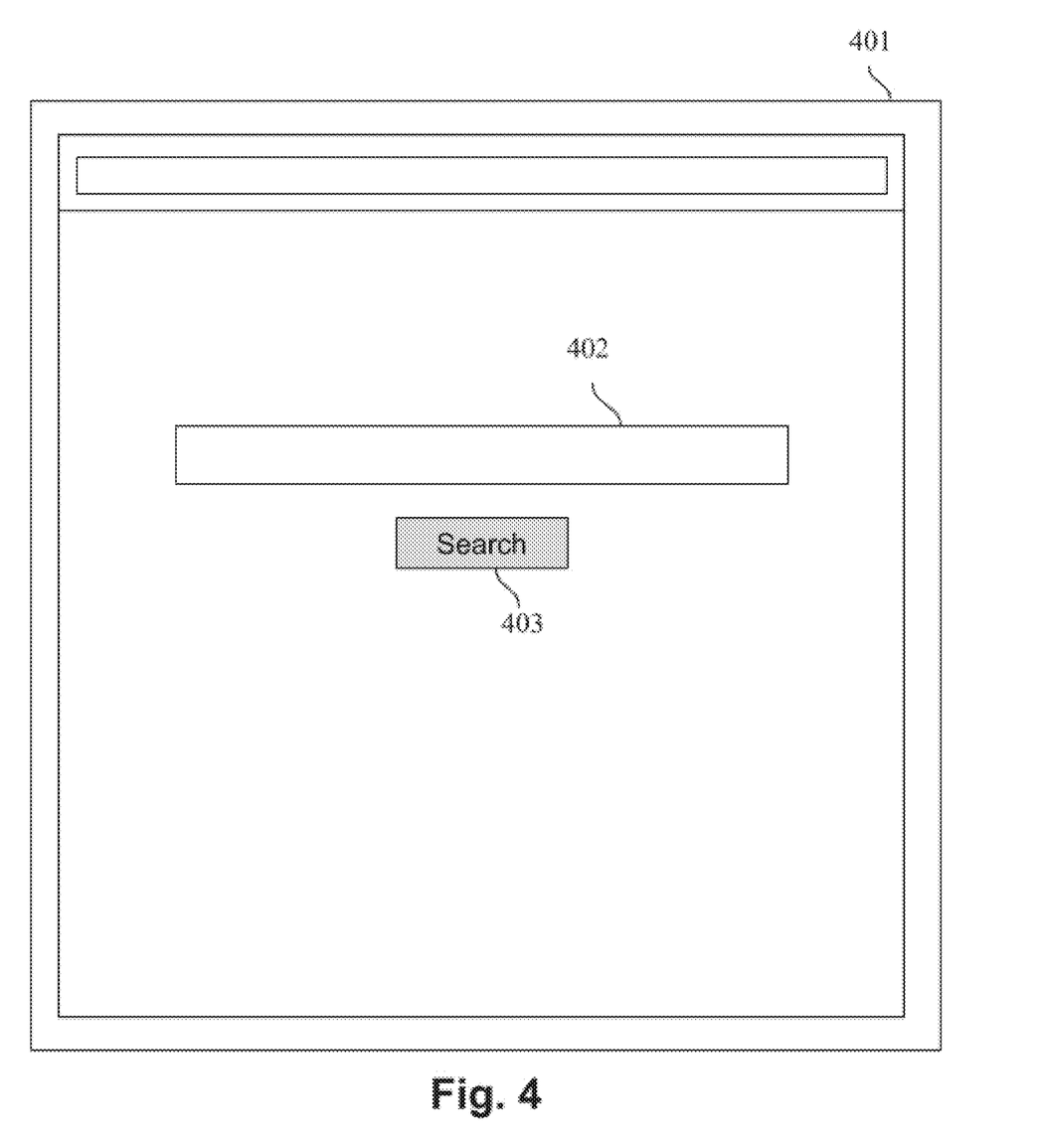
FIG. 4 shows an example web browser in accordance with one or more embodiments of the present disclosure.
Figure 5:
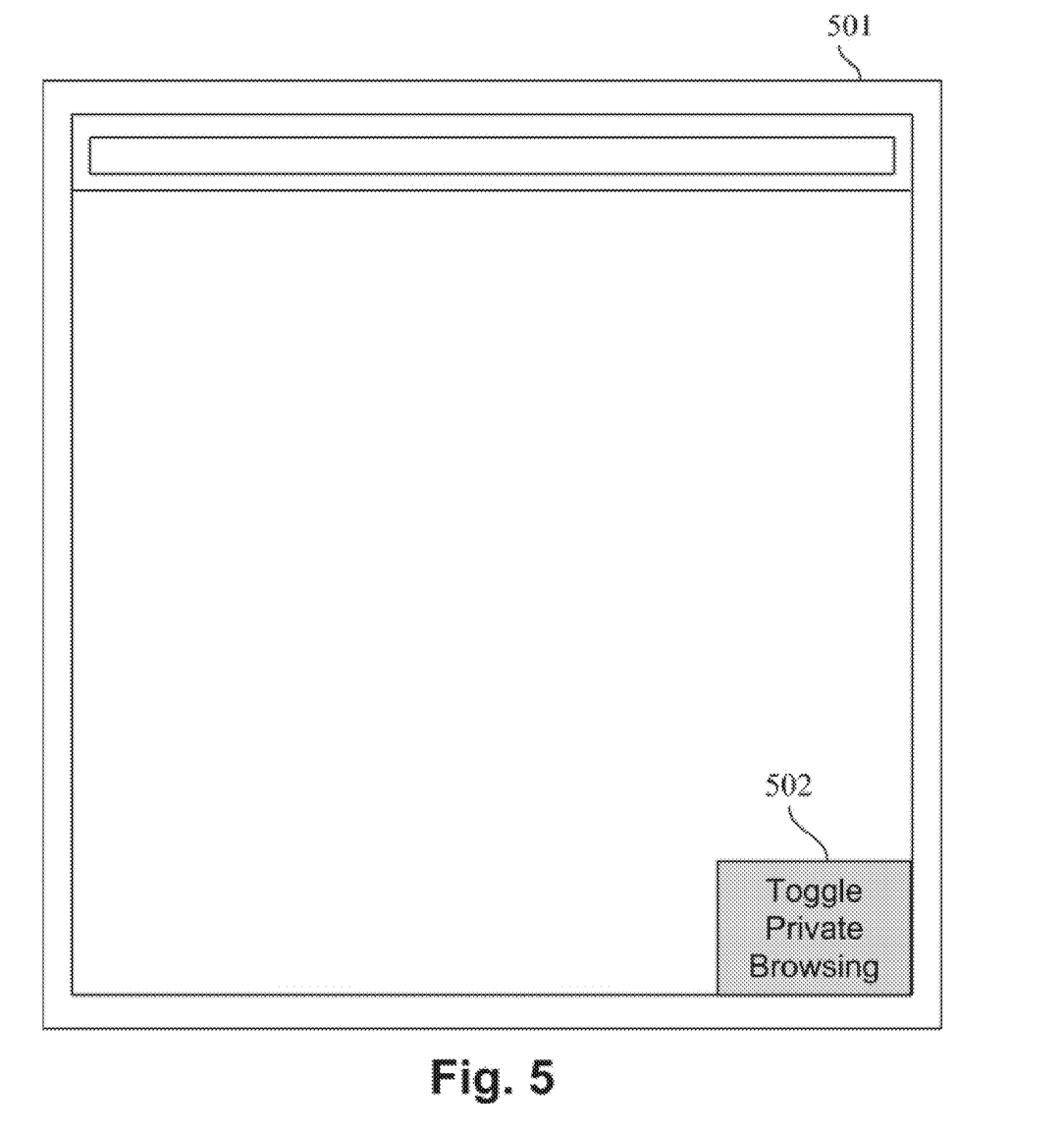
FIG. 5 shows an exemplary web browser in accordance with one or more embodiments of the present disclosure.
Figure 6:
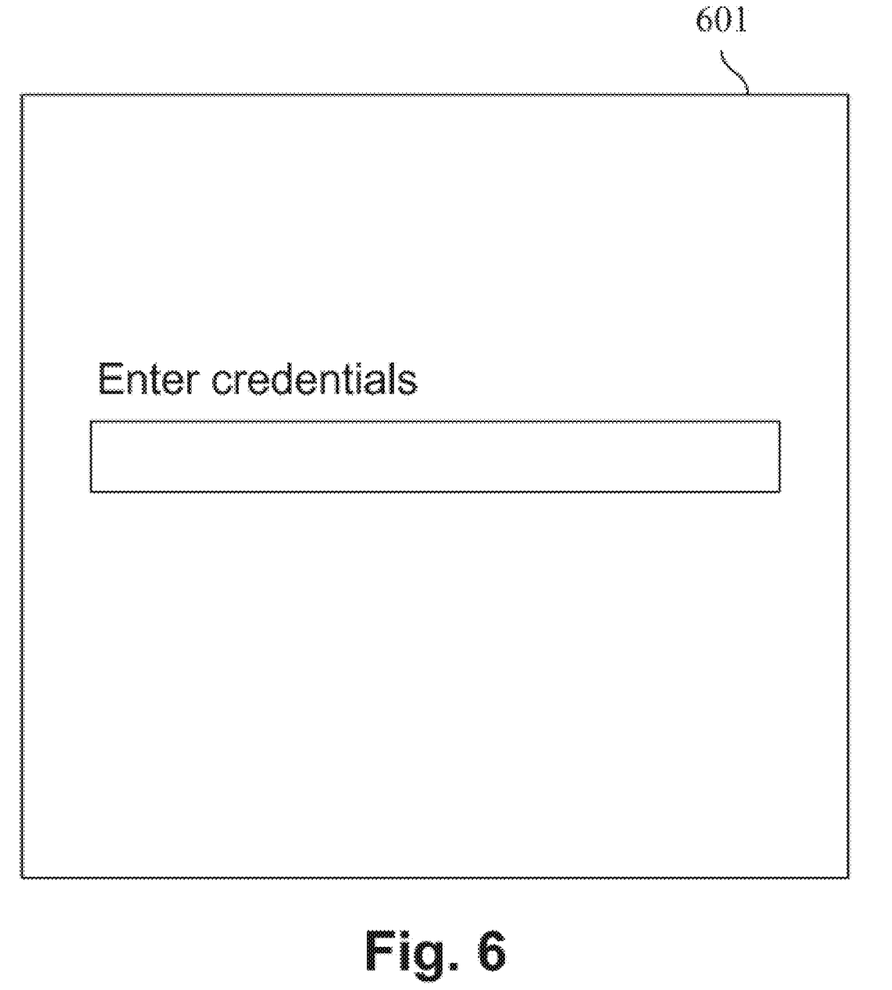
FIG. 6 shows an exemplary credential authentication dialog in accordance with one or more embodiments of the present disclosure.

Referring now to the invention in more detail, shown in FIG. 1 is a flow diagram 100 of a method of configuring a browsing session's privacy mode comprised of starting a browsing session 101, determining if the browsing session has a traceless privacy level mode property 102, activating a traceless browsing mode with a hidden credential authentication system 103, storing no browsing data 104, activating a traced browsing mode 105, and storing browsing data 106. Shown in FIG. 2 is a flow diagram 200 of hiding a credential authentication system 201, inputting credentials 202, verifying if inputted credentials match stored credentials 203, and unblocking access to private browsing data 204. Shown in FIG. 3 is a computing system 301, processing unit 302, storage system 303, communication system 304, input system 305, and output system 306. Shown in FIG. 4 is an example web browser 401, text input box 402, and search button 403. Shown in FIG. 5 is an exemplary web browser 501 and graphical user interface option 502. Shown in FIG. 6 is an exemplary credential authentication dialog 601.

At block 101, a browsing session with a privacy level mode property is either created or resumed. At block 102, the privacy level mode property is evaluated to determine if the current browsing session is a traced browsing session or a traceless browsing session. If the privacy level mode property is traceless, then the process proceeds to 103. If the privacy level mode property is traced, then the process proceeds to 105.

At block 103, the traceless browsing session is activated. It is integrated with a hidden credential authentication system and is configured with browsing properties that can include, but are not limited to: a custom graphical user interface and varied security settings. At block 104, the traceless browsing session does not store one or more types of browsing data that can include, but is not limited to: bookmarks, history, downloads, cookies, search history, cache, media, and credentials.

At block 105, the traced browsing session is configured with traced browsing properties that can include, but are not limited to: a custom graphical user interface and varied security settings. At block 106, the traced browsing session stores one or more types of browsing data, that can include, but is not limited to: bookmarks, history, downloads, cookies, search history, cache, media, and credentials.

In some embodiments, a hidden credential authentication system is integrated into the traced browsing mode.

In some embodiments, a hidden credential authentication system is integrated into the traceless browsing mode.

In some embodiments, a hidden credential authentication system is integrated into both the traced and traceless browsing modes.

At block 201, the hidden credential authentication system is activated. The hidden credential authentication system is used to authenticate credentials. Types of credentials can include, but are not limited to: passwords and biometric credentials. At block 202, credentials are inputted to be processed by the hidden credential authentication system. At block 203, the inputted credentials are compared to stored credentials. If the credentials match, the process proceeds to 204.

In some embodiments, an example web browser 401 contains text input box 402 and search button 403. If a specific key or search button 403 is pressed and the text inputted into the text input box 402 matches stored credentials, then the process proceeds to 204. If the text inputted into the text input box 402 does not match stored credentials, then it may be used for one or more different purposes. A non-limiting example is performing a web search query for the incorrect credentials.

In some embodiments, an exemplary web browser 501 contains graphical user interface option 502. Graphical user interface option 502 can have one or more abilities. A non-limiting example is having the ability to start a private browsing session and having the ability to present a graphical user interface for the hidden credential authentication system. The one or more abilities of graphical user interface option 502 can be accessed in several ways. A non-limiting example is accessing the different abilities of graphical user interface option 502 through different interactions using an input device. If graphical user interface option 502 is accessed to present a graphical user interface for the hidden credential authentication system, then the process proceeds to display exemplary credential authentication dialog 601. If graphical user interface option 502 is accessed for an ability other than to present a graphical user interface for the hidden credential authentication system, then the process proceeds to execute that ability. A non-limiting example is accessing graphical user interface option 502 to execute an ability to change the privacy level mode property.

In some embodiments, a user is presented with exemplary credential authentication dialog 601. Non-limiting examples of credentials that can be inputted are passwords and biometric credentials. A user may be asked to input credentials in several ways. A non-limiting example is displaying text that requests the user to input their credentials. Another non-limiting example is hiding the credential authentication ability embedded in credential authentication dialog 601 by displaying text unrelated to the hidden credential authentication system. This helps to prevent users other than the main user to discover the hidden credential authentication system embedded in credential authentication dialog 601. If credentials inputted into credential authentication dialog 601 match stored credentials, then the process proceeds to 204. If credentials inputted into credential authentication dialog 601 do not match stored credentials, then they may be used for a different purpose. A non-limiting example is performing a web search query for the incorrect credentials.

In some embodiments, if inputted credentials do not match stored credentials, then the process will return to waiting for credentials to be inputted. The current user may not be notified of the incorrect credentials in order to hide the existence of the hidden credential authentication system.

In some embodiments, if inputted credentials do not match stored credentials, then they may be used in another manner before the process returns to waiting for the user to input their credentials. A non-limiting example is performing a web search query for the incorrect credentials.

At block 204, private browsing data protected by the user's credentials is decrypted and the user is granted access to it. In some embodiments, one or more types of private browsing data can be modified once the user is granted access to the private browsing data.

In some embodiments, access to the private browsing data is lost if the browsing session ceases to exist.

In other embodiments, access to the private browsing data is lost if a web browser application is closed.

In an embodiment in which the user loses access to private browsing data, the private browsing data will become protected with stored credentials when access to the private browsing data is lost and credentials will need to be inputted into the credential authentication system again in order to re-access the private browsing data.

In some embodiments, one or more types of private browsing data are encrypted with one or more cryptographic methods before they are stored on a storage medium.

In other embodiments, one or more types of private browsing data are encrypted with one or more cryptographic methods after they are stored on a storage medium.

In some embodiments, private browsing data is decrypted before the user is authenticated.

In other embodiments, private browsing data is decrypted after the user is authenticated.

Computing system 301 is capable of implementing one or more of the embodiments described and/or illustrated herein. Non-limiting examples of computing system 301 are personal computers and smartphones. Computing system 301 includes processing unit 302, storage system 303, communication system 304, input system 305, and output system 306. Processing unit 302 executes instructions stored on storage system 303. Processing unit 302 may also perform any other steps, methods, or processes described and/or illustrated herein. Storage system 303 stores data and may include one or more storage mediums. Examples of storage medium types include, but are not limited to, primary storage such as volatile and secondary storage such as nonvolatile. Communication system 304 consists of one or more communication devices that connect computing system 301 to the internet in order for computing system 301 to have the ability to browse it. Examples of communication devices include, but are not limited to, wired and wireless. Input system 305 can include one or more input devices in order for the user to input data into. The inputted data may then be processed by processing unit 302. Examples of input devices include, but are not limited to, computer keyboards, computer mouses, and touchscreens. In an exemplary embodiment, input system 305 is used to input credential data at block 202. Output system 306 consists of one or more output devices in which data can be presented. Examples of output devices include, but are not limited to, monitors and speakers.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is my intent they be deemed within the scope of my invention.

It is to be understood that the phraseology and terminology employed herein is not to be construed as limiting and are for descriptive purpose only.

What is claimed is:

1. A computer implemented method, comprising:
creating or resuming a browsing session;
integrating a credential authentication system into one or more browsing modes, where in at least one browsing mode:
the credential authentication system is accessible to the user after the user performs at least one predetermined interaction using at least one input device of a user interface, and
the at least one predetermined interaction to access the credential authentication system is not communicated to the user by the user interface;
storing credentials on a storage medium;
encrypting private browsing data in order to block and protect access to the private browsing data;
interfacing with the at least one input device of the user interface to perform the at least one predetermined interaction;
providing access to the credential authentication system after the user performs the at least one predetermined interaction using the at least one input device of the user interface;
allowing a user to input their credentials into the credential authentication system when access to the credential authentication system is provided;
comparing credentials inputted into the credential authentication system to the credentials stored on the storage medium after credentials are inputted into the credential authentication system; and
decrypting and unblocking access to the encrypted private browsing data upon a condition in which the inputted credentials match the credentials stored on the storage medium.

2. The computer implemented method of claim 1, wherein the private browsing data includes browsing histories.

3. The computer implemented method of claim 1, wherein the private browsing data includes bookmarks.

4. The computer implemented method of claim 1, wherein the private browsing data includes downloads.

5. The computer implemented method of claim 1, wherein the private browsing data includes search histories.

6. The computer implemented method of claim 1, wherein the private browsing data includes cached data.

7. The computer implemented method of claim 1, wherein the private browsing data includes media.

8. The computer implemented method of claim 1, wherein the private browsing data includes credentials.

9. The computer implemented method of claim 1, further comprising modifying one or more types of the private browsing data once inputted credentials match the stored credentials.

10. The computer implemented method of claim 1, further comprising blocking access to the private browsing data upon a condition in which access to the private browsing data is lost.

11. The computer implemented method of claim 1, further comprising blocking access to the private browsing data upon a condition in which the browsing session ceases to exist.

12. The computer implemented method of claim 1, further comprising blocking access to the private browsing data upon a condition in which a web browser application is closed.

13. The computer implemented method of claim 1, further comprising blocking access to the private browsing data upon a condition in which a computing system is terminated.

14. The computer implemented method of claim 1, further comprising returning to waiting for credentials to be inputted again upon a condition in which inputted credentials do not match credentials stored on the storage medium.

15. The computer implemented method of claim 1, further comprising integrating the credential authentication system into a text input box.

16. The computer implemented method of claim 15, wherein the stored credentials are a password.

17. The computer implemented method of claim 16, further comprising performing a search query upon a condition in which text inputted into the text input box does not match credentials stored on the storage medium.

18. The computer implemented method of claim 1, wherein the stored credentials are biometric data.

19. The computer implemented method of claim 18, further comprising using one or more biometric systems to allow for biometric data to be inputted into the credential authentication system.

20. The computer implemented method as recited in claim 1, wherein the browsing session is created or resumed in a web browser application, where the web browser application has traced and traceless browsing modes.

21. A non-transitory computer-readable medium with instructions stored thereon, that when executed by a processor, perform the steps comprising:
creating or resuming a browsing session;
integrating a credential authentication system into one or more browsing modes, where in at least one browsing mode:
the credential authentication system is not accessible to the user without the user performing at least one predetermined interaction using at least one input device of a user interface, and
the at least one predetermined interaction to access the credential authentication system is not communicated to the user by the user interface;
storing credentials on a storage medium;
encrypting private browsing data in order to block and protect access to the private browsing data;
interfacing with the at least one input device of the user interface to perform the at least one predetermined interaction;
providing access to the credential authentication system after the user performs the at least one predetermined interaction using the at least one input device of the user interface;
allowing a user to input their credentials into the credential authentication system when access to the credential authentication system is provided;
comparing credentials inputted into the credential authentication system to the credentials stored on the storage medium upon a condition in which credentials are inputted into the credential authentication system; and
decrypting and unblocking access to the encrypted private browsing data upon a condition in which the inputted credentials match the credentials stored on the storage medium.

22. A web browsing apparatus that hides and protects access to private browsing data that is encrypted, the web browsing apparatus comprising:
- a storage system that can store web browsing data, credentials, and instructions executable by a processing unit;
- an input system to input data into a web browser;
- a processing unit to operate the web browser, a user interface, and a credential authentication system to compare inputted credentials to credentials stored on the storage system; and
- a communication system to connect to the internet; wherein, in at least one browsing mode,
- access to the credential authentication system is allowed after at least one predetermined interaction is performed by interfacing with at least one input device of the user interface; and
- the at least one predetermined interaction to access the credential authentication system is not communicated to the user by the user interface.

* * * * *